United States Patent
Schrattenecker

(10) Patent No.: US 9,894,841 B2
(45) Date of Patent: Feb. 20, 2018

(54) REEL FOR A HARVESTER

(71) Applicants: CNH Belgium N.V., Zedelgem (AT);
BISO Schrattenecker GmbH, Ort im Innkreis (AT)

(72) Inventor: Franz Schrattenecker, Eggerding (AT)

(73) Assignees: BISO Schrattenecker GmbH, Ort im Innkreis (AT); CNH Belgium N.V., Zedelgem (BE)

(*) Notice: Subject to any disclaimer, the term of this patent is extended or adjusted under 35 U.S.C. 154(b) by 62 days.

(21) Appl. No.: 14/357,726

(22) PCT Filed: Nov. 9, 2012

(86) PCT No.: PCT/EP2012/072291
§ 371 (c)(1),
(2) Date: May 13, 2014

(87) PCT Pub. No.: WO2013/068543
PCT Pub. Date: May 16, 2013

(65) Prior Publication Data
US 2014/0283494 A1    Sep. 25, 2014

(30) Foreign Application Priority Data
Nov. 11, 2011   (DE) .................. 10 2011 118 315

(51) Int. Cl.
*A01D 57/00*   (2006.01)
*A01D 57/02*   (2006.01)

(52) U.S. Cl.
CPC .................... *A01D 57/02* (2013.01)

(58) Field of Classification Search
CPC ......................................... A01D 57/02
USPC ................. 56/14.3, 14.4, 220, 226
See application file for complete search history.

(56) References Cited

U.S. PATENT DOCUMENTS

| | | | | |
|---|---|---|---|---|
| 1,551,476 A | * | 8/1925 | Feild | A01D 57/04 56/227 |
| 2,795,921 A | * | 6/1957 | Hume | 56/226 |
| 2,823,511 A | * | 2/1958 | Beaty | 56/226 |
| 2,910,819 A | * | 11/1959 | Helliwell | A01D 57/04 56/220 |
| 3,145,520 A | | 8/1964 | Hume et al. | |
| 3,468,109 A | * | 9/1969 | Reimer | 56/220 |
| 3,585,815 A | | 6/1971 | Hubbard | |
| 3,633,345 A | * | 1/1972 | Scarnato et al. | 56/14.1 |
| 3,771,299 A | * | 11/1973 | Gradwohl et al. | 56/220 |
| 4,016,710 A | | 4/1977 | May et al. | |

(Continued)

FOREIGN PATENT DOCUMENTS

DE    1218778 B    6/1966
GB    1244819 A    9/1971

*Primary Examiner* — Thomas B Will
*Assistant Examiner* — Mai Nguyen
(74) *Attorney, Agent, or Firm* — Peter K. Zacharias; Patrick M. Sheldrake

(57) ABSTRACT

A reel for a harvester, such as for a combine harvester. The reel includes a reel supporting pipe and star-shaped supports at the ends of the reel, the star arms being connected to each other by means of tine rods which run parallel to the supporting pipe, wherein the star-shaped supports are specifically at least partially reinforced as a result of which at least one of the tensile and compression forces acting on the supporting pipe can be absorbed by one or more tine rods.

8 Claims, 4 Drawing Sheets

(56) References Cited

U.S. PATENT DOCUMENTS

| | | | | |
|---|---|---|---|---|
| 4,038,810 | A * | 8/1977 | Williams et al. | 56/220 |
| 4,067,177 | A * | 1/1978 | Tout | 56/226 |
| 4,751,809 | A * | 6/1988 | Fox et al. | 56/226 |
| 4,776,155 | A * | 10/1988 | Fox et al. | 56/220 |
| 7,370,463 | B2 * | 5/2008 | Schumacher et al. | 56/364 |
| 7,665,287 | B2 * | 2/2010 | Jones | 56/364 |
| 2010/0281840 | A1 * | 11/2010 | Remillard | 56/220 |
| 2014/0325952 | A1 * | 11/2014 | Herringshaw | A01D 57/02 56/227 |

* cited by examiner

REEL FOR A HARVESTER

This application is the US National Stage filing of International Application Serial No. PCT/EP2012/072291 filed on Nov. 9, 2012 which claims priority to German Application 10.2011.118.315.2 filed Nov. 11, 2011, each of which is incorporated herein by reference in its entirety.

TECHNICAL FIELD

The invention concerns a reel for a harvester, in particular for a combine harvester with a reel supporting pipe and star-shaped supports placed at the end of the reel supporting pipe, the arms of the star being connected to each other by means of tine rods which run parallel to the supporting pipe.

BACKGROUND ART

A rotating reel is mounted on a harvesting device for a harvesting machine to guide the crop to a cutting means as well as, if necessary, a feeding shaft. The reel includes a plurality of tine rods extending transversely to the direction of travel with protruding tines for engaging the crop. The reel is basically supported by the supporting pipe in the centre of the reel, the longitudinal axis thereof forming the rotational axis of the reel.

Fundamentally, the demand for larger, especially broader, headers for self-propelled harvesters is growing in the agricultural machinery industry. In particular the width, i.e. the dimension of the header transversely to the direction of travel, determines the time required for the harvesting process, as the field can be harvested in less time and with less runs with a wider header. However, an increase in the working width can reduce the stability of the overall construction, since the stress on the material depends on the quantity of material used.

The same applies for producing a reel which extends over the overall width of the header. While the machine is in operation, the mounted reel is exposed to increasing tensile and compression forces. In relation to the desired crop yield, an excessive bending of the reel is not desirable, as this would vary too much the distance between the crop and the reel, leading to different cutting results over the width of the reel.

Currently, the tensile and compression forces which occur are almost fully absorbed by the central supporting pipe of the reel. Any increase on the stress on the material of the supporting pipe, depending on the reel dimension, must be compensated by reinforcing the supporting pipe. This is achieved by either increasing the pipe diameter or using alternative materials, which however often leads to a significant increase in the weight of the reel or an enormous increase in cost. In addition, the increase in weight increases the occurring bending forces and worsens the energy balance of such harvesters, since an increase in weight usually brings higher fuel consumption for the harvester.

Consequently, there is a major concern in the development of harvesting equipment and reels to achieve a maximum total weight reduction without being penalized by a sensitive increase in development costs or production costs.

SUMMARY OF THE INVENTION

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

According to the invention, the connecting part between the supporting pipe and the parallel running tine rods should be strengthened to allow an advantageous distribution of the occurring tensile and compression forces on the supporting pipe as well as one or more tine rods. This is achieved by a specific, partly or completely reinforcement of the star-shaped supports located at the end of the supporting pipe, which constitute the connecting link between the supporting pipe and the tine rods. In particular, the axial area moment of inertia of the star arms in the direction of the axis of rotation is increased.

The supporting pipe, the star-shaped supports, as well as the tine rods form a cage structure, which ensures distributed absorption of the occurring tensile and compression forces. The entire reel design allows a significant weight reduction, without having to accept any impairment on the torsional rigidity of the construction. Overall bigger or wider reel designs can be conceived and built.

Preferably, the entire reel has six tine rods, which each have a substantially circular or profiled cross section. In this case, each star-shaped support placed at the end of the reel supporting pipe, as well as, if necessary, intermediate star-shaped supports have six support arms. Preferably, one or more tine rods are rotatable around their longitudinal axis with respect to the star-shaped supports and the intermediate star-shaped supports. The use of hollow tine rods or hollow tine pipes is possible.

The reinforcement can be achieved, for example, with one or more additional reinforcement parts, like reinforcement plates. However, a built-in reinforcement of particular parts of the star-shaped support, in particular of the support arms, is useful, in order to avoid the cost of mounting separate reinforcement parts.

Possibly, the reel can have one or more intermediate star-shaped supports which are arranged on the supporting pipe in the longitudinal direction between the star-shaped supports at the end of the reel. A reinforced version of the intermediate star-shaped supports could be advantageous.

It is conceivable that one or more arms of the star-shaped supports at the end of the reel supporting pipe are formed by two parallel running plates. The use of two triangular shaped, parallel running plates is particularly advantageous. In this case one side of the triangle is connected to the supporting pipe, each of the two outer corners of the parallel running plates forming the tips of the arm of the star. The corners which form the tips of the arms of the star-shaped supports can be connected to the each other by means of a connecting element, which is also designed to insert a tine rod.

A star-shaped support can consist of an annular hub, the arms of the star extending radially outwards from the outer circumference of the hub. The hub itself can also be partially or fully reinforced. The connection between the arms of star-shaped support and the hub is achieved by welding, glueing, or another suitable connection technique. The hub and the arms of the star can also be made from one casting.

Advantageously, the individual arms of a star-shaped support, especially the tips of the arms of said support, can be connected by at least one plate, which preferably is self-reinforced itself.

In a preferred embodiment of the invention, one or more installed tine rods are composed of at least two rod segments. Preferably, the rod segments have an interlocking connection to each other to enable an optimal force transmission between the rod segments. For example, a suitable interlocking connection would be achieved by one or more dovetail joints between the rod segments.

It is conceivable that individual rod segments are connected at the supporting tip of the intermediate star-shaped supports. For optimal force transmission, it is also necessary that one or more tine rods are suitably connected to the star-shaped supports placed at the end of the reel. In this case, it turns out that an interlocking and/or frictional connection is appropriate.

To increase the torsional rigidity of the reel, it is particularly advantageous if the supporting pipe is fixed by means of one or more bracings extending in the longitudinal direction.

It is preferable that one or two bracings are achieved with cables, which run fully or at least partially in the longitudinal direction adjacent the outer circumference of the supporting pipe.

The present invention allows the construction of a reel having a width in the range of twelve meters or more. The embodiment according to the invention ensures a satisfactory flexural stiffness despite the enormous dimension, without having to be penalized by a noticeable increase in weight. Furthermore, the resulting production costs are reduced since no or few additional reel parts are required. A possible hindrance to machine operators due to the impairment on their visual field by additional reel parts is avoided—the usual ease of operation of the harvesting equipment is maintained without any additional feature.

The invention further relates to a reel according to the features of claim 8. Consequently, the reel comprises at least one tine rod, which has at least one spring tine. One or more spring tines usually comprise one or more spring coils. According to this aspect of the invention, at least one spring coil is at least partially embedded in the tine rod. Preferably, at least one spring coil is fully embedded in the tine rod section.

It is conceivable that the tine rod essentially has the shape of a tube, the outer circumference of the tine rod having at least one opening, preferably in the form of the installed spring coil, and that at least one spring coil can be inserted into this opening. It is particularly advantageous if the inserted coil completes the circular or tube shape of the tine rod.

The insertion of at least one spring coil in the tine rod prevents the crop from getting tangled up in the protruding spring coil during the operation of the reel.

An advantageous embodiment of the reel comprises at least one spring tine with a bracket to fix it to the tine rod. The bracket could follow the circumference of the rod and preferably be fixed to the rod by a screw connection. It is also conceivable for the bracket to have a clamping connection between the tine and the tine rod. A combination of a clamping and a screw connection is appropriate.

Such reel is preferably designed in accordance with the features of any of the claims 1 to 7. Consequently, the reel clearly evidently shows the same advantages and benefits of the previously described reel, which is why another description is not given here.

The invention further relates to a harvesting machine header comprising a reel according to the previous embodiments. The previous statements regarding the features and properties of the reel according to the invention are also applicable to the header. Preferably, the header comprises all components necessary for use with a combine.

Furthermore, the invention concerns a tine rod as well as a spring tine for the construction of a reel according to any of the advantageous embodiments. The tine rod has at least one or more openings for complete or at least partial insertion of at least one spring coil. The spring tine mounting preferably comprises a bracket for achieving a clamping and/or a screw connection with the tine rod. The abovementioned embodiments equally apply for the properties and advantages of the tine rod or spring tine according to the invention.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DESCRIPTION OF THE DRAWINGS

Further advantages and details of the present invention will now be described in greater detail, by way of example, with reference to the following drawings in which.

DETAILED DESCRIPTION OF AN EMBODIMENT OF THE INVENTION

Figure 1:
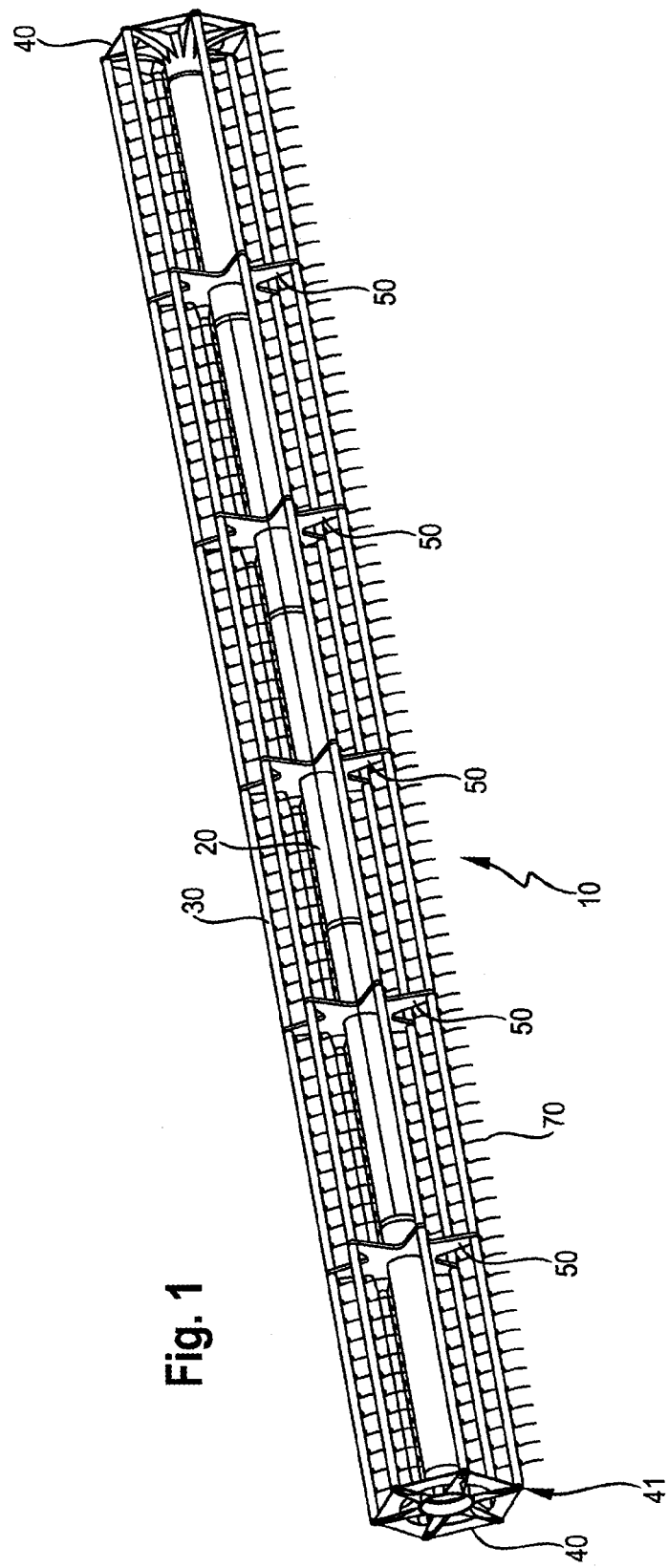
FIG. 1 is a perspective view of a reel according to the invention.

FIG. 1 shows a perspective view of the reel 10 according to the invention. The supporting pipe 20 extends along the rotational axis of reel 10, which is connected at its end to the two star-shaped supports 40. Between the star-shaped supports 40 at the end of the reel there are five intermediate star-shaped supports 50 which are connected to the outer circumference of the supporting pipe 20. Each star-shaped support 40, 50 comprises six tapered star arms.

The supporting pipe 20 is preferably made of aluminum. The star-shaped supports 20 are preferably made of aluminum. The intermediate star-shaped supports 50 can be made of plastic. However, it is also possible to make the intermediate star-shaped supports 50 from aluminum, in particular as aluminum moldings.

For the mounting of the spring tines 70, the reel 10 comprises six tine rods 30 in total, which run parallel to the supporting pipe 20. The tine rods 30 can be made from aluminum. In particular, they can be made from aluminum profiles. All tine rods are attached at their ends to an arm tip 41 of the star-shaped supports 40 at the end of the reel and likewise mounted to the tips of the arms of the intermediate star-shaped supports 50. The mounting of the tine rods 30 to the star-shaped supports 40, as well as to the intermediate star-shaped supports 50, enables a rotation of the individual tine rods 30 about their longitudinal axis, so that the spring tines 70 can be directed in an appropriate position for the harvest.

Previously, the flexural stiffness of reels according to the state of the art was almost exclusively determined by the rigidity of the supporting pipe. The basic idea of the invention is to provide a suitable construction enabling to distribute the occurring pressure and traction forces over the supporting pipe 20 as well as over the tine rods 30, the star-shaped supports and the intermediate star-shaped supports 40, 50, in order to create an optimal torsional rigidity of the entire reel 10.

Figure 2:
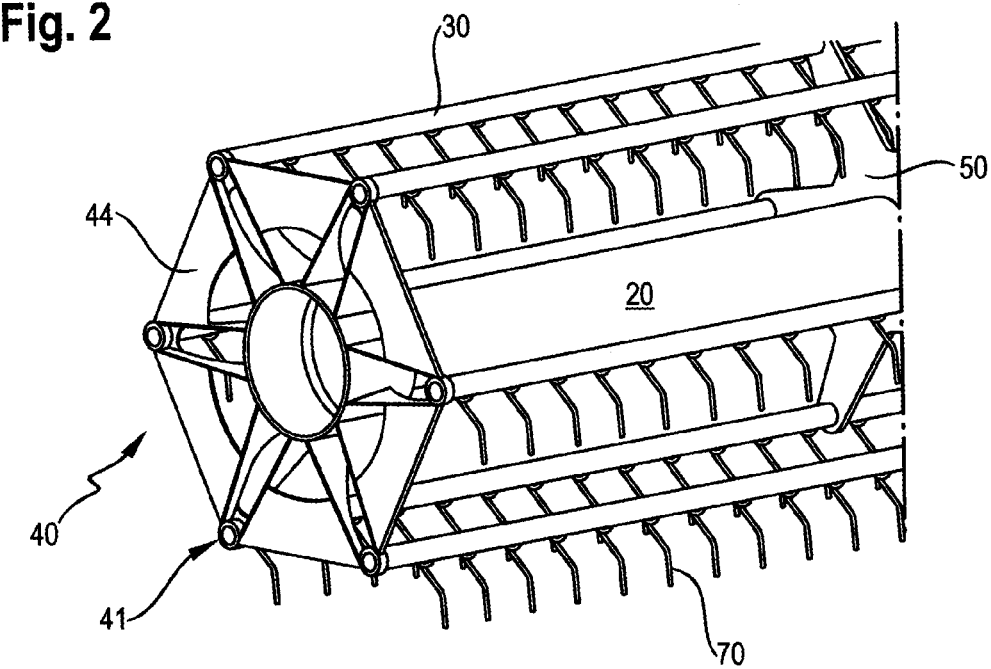
FIG. 2 is a perspective view of the outside of the star-shaped support placed at the end of the reel according to the invention.
Figure 3:
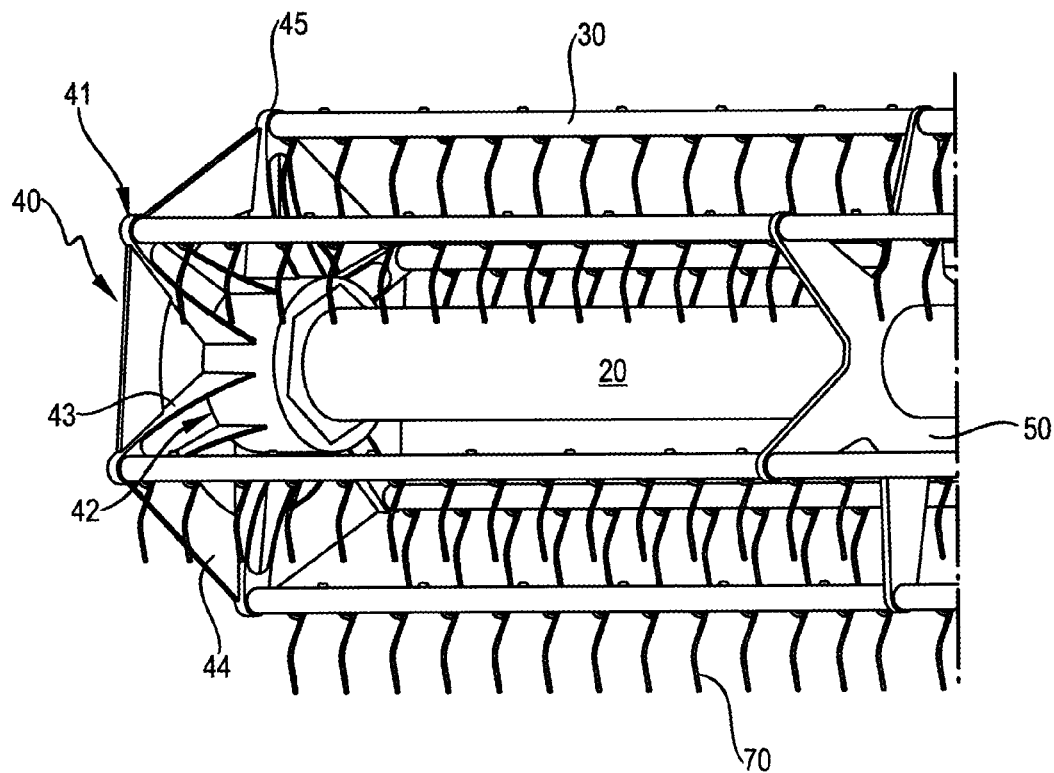
FIG. 3 is a perspective interior view of the star-shaped support according to FIG. 2.

With reference to FIGS. 2 and 3, the construction according to the invention of reel 10 will be explained in more detail. Both drawings show a perspective view of the right end section of the reel 10 with respect to the direction of travel of the harvester. The star-shaped support 40 at the end of the reel consists of a ring-shaped star hub 42, which is coaxially pushed on the outer diameter of the supporting pipe 20 and fixed accordingly. Each pair of radially outward extending plates 43 from the hub 42 forms an arm of the star. The plates of an arm of the star are identical and run parallel to each other. One side of the triangular plate 43 runs outwards in a radial direction from the hub 42. The shortest side is positioned on the surface of the hub 42. The remaining side is the longest side of the triangle, which is preferably not straight but curved, in order to increase the axial area moment of inertia of the arm in the direction of the rotation axis of the reel.

The outer corners of two adjacent plates 43 form a tip 41 of the arm of the star-shaped support, the corners being connected by a connecting element 45, in which a tine rod 30 can be inserted. The plates 43 are welded, glued, or screwed to the hub on a side of the triangle.

The adjacent plates 43 of adjacent star arms are additionally connected near the tips 41 of the arm of the star-shaped supports with a connecting plate 44. This consequently results in a star-shaped support 40 whose connecting plates 44 form an equilateral hexagonal framework.

The design of the other star-shaped support 40 at the end of the reel 10 is identical to the form represented.

The design of the arms of the star-shaped support 40 according to the invention allows an optimal force transmission of the tensile and compression forces on the supporting pipe 20 to the fixed tine rods 30. The resulting reel construction forms a cage with optimal rigidity properties, so as to make the implementation of reels with much larger physical dimensions conceivable.

The width, i.e. the longitudinal extension of the reel 10, can be increased to 12 meters or more, without being obliged to enlarge, i.e. to increase in diameter, of the supporting pipe 20 in the cage structure according to the invention.

Figure 4:
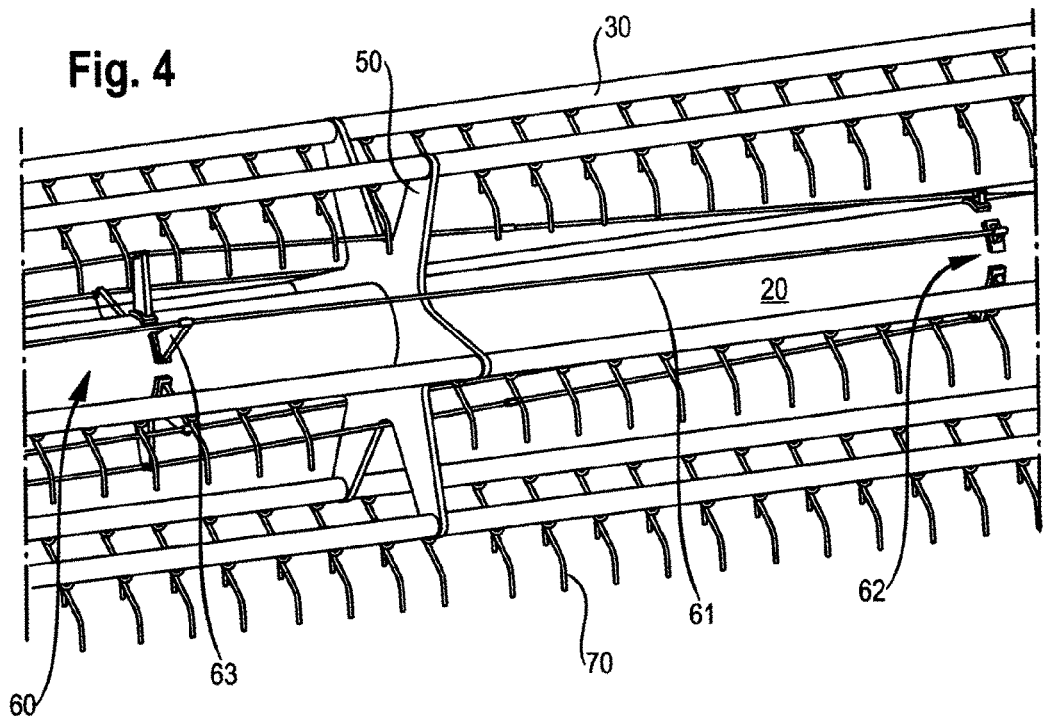
FIG. 4 is a perspective view of the central part of the reel.

A further optimization of the flexural stiffness of the reel according to the invention is realized by applying the bracing 60 shown in FIG. 4. Several cables 61, running along the outer circumference of the supporting pipe 20 in the longitudinal direction, are fixed at their ends tot the reel supporting pipe 20 by means of the connection means 62. Spacers 63 for the cable 61 are fixed on the supporting pipe 20, through which spacers the cables 61 run at a certain distance from the supporting pipe 20. Tensioning elements are provided for pre-tensioning the cables 61. As shown in FIG. 1, the full bracing extends in the central area of the reel 10, delimited by the two outer intermediate star-shaped supports 50.

Figure 5:
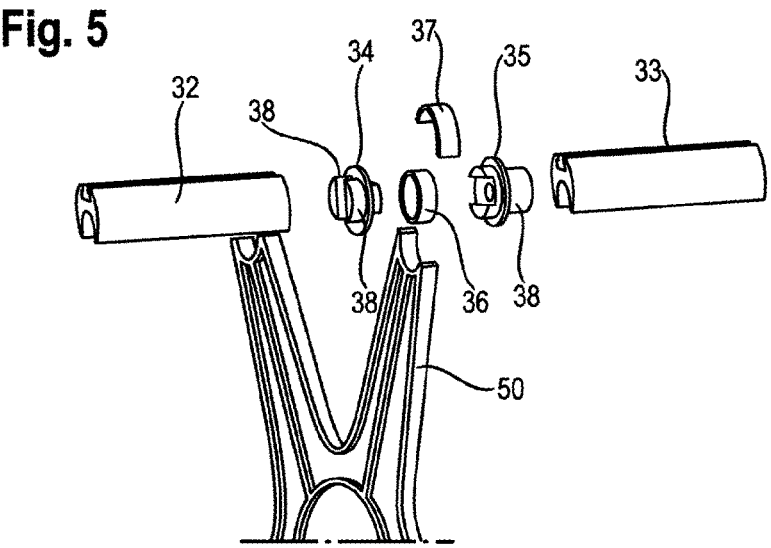
FIG. 5 is an exploded view of the connection between two tine rod segments.

FIG. 5 shows an exploded view of the interlocking connection between 2 tine rod segments 32, 33. The tine rod segments 32, 33 are preferably made of aluminum and preferably made from aluminum profiles. The connection point of the tine rod segments 32, 33 is located on the tip of the arm of an intermediate star-shaped support 50. Overall, a continuous tine rod 30 shown is formed from six rod segments, which are connected to each other on the tips of the arms of the intermediate star-shaped supports 50.

The interlocking connection is achieved with both connecting parts 34, 35, which act like a dovetail joint. The connecting part 34 acts as a dovetail here. Both connecting parts 34, 35 are fixed with a plug connection at the end of each rod section 32, 33. To that end, each connecting part 34, 35 has protruding parts 38, which are pressed into suitable recesses in the end surfaces of the rod segments. In addition, the connecting parts 34, 35 may be screwed to the rod segments 32, 33.

For rotatably supporting the joined connecting parts 34, 35 and the rod segments 32, 33, a bearing ring 36 is placed over the dovetail joint and mounted on the intermediate star-shaped support 50 by means of a bracket 37.

The technique to connect the segments 32, 33 of the rods according to the invention allows an optimal flow of force between the segments 32, 33.

Figure 6:
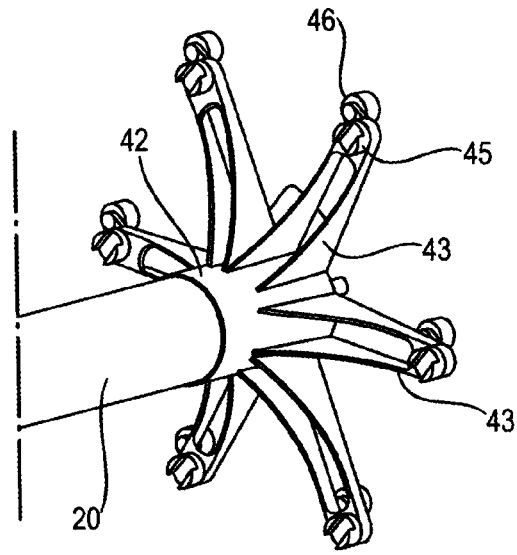
FIG. 6 is a perspective view of a partial structure of the star-shaped supports at the end of the reel.

FIG. 6 once again illustrates the design of a star-shaped support 40 at the end of the reel. The individual connecting elements 45 to the tips of the arms of the star-shaped support 41 likewise provide means for a plug connection to the tine rods 30. In particular, the connecting element 45 includes a connecting part 46 which is rotatably mounted on the supporting arm tip. Moreover, in analogy with the connecting parts 34, 35, two protruding parts are provided, which can be pressed in the corresponding recesses in the tine rods 30.

Figure 7:
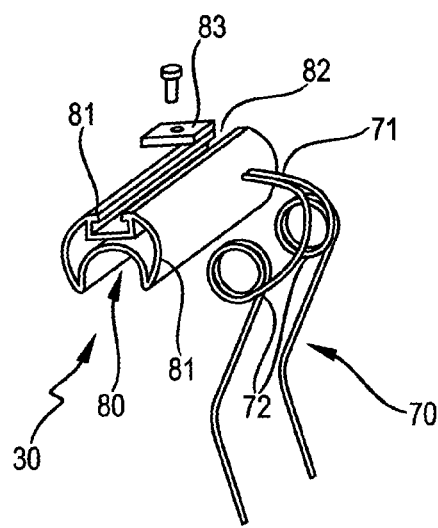
FIG. 7 is a partial view of the tine rods according to the invention, with the tines according to the invention.

The connection technique between a spring tine 70 and a tine rod 30 is explained in FIG. 7. The drawing shows a section of a part of the tine rod, having notches at the end sections of the tine rod 30 to insert the protruding moldings of the connecting parts 34, 35, 46. The cross section of tine rod 30 is essentially circular in shape, while the circumference of the rod as shown in the drawing has a semi-circle shaped opening 80 at the bottom, which extends over the entire longitudinal extent of the tine rod 30.

In addition, FIG. 7 shows a twin spring tine 70 with two adjacent spring coils 72, which are connected by a bracket 71. To fix the spring tine 70 to the tine rod 30, both coils 72 are inserted into the openings 80 provided in the tine rod 30, the outer diameters of the coils 72 completing the circular shaped circumference of tine rod 30. The bracket 71 is placed on the circumference of the tine rod 30, by which a clamping connection is realized between the spring tine 70 and the tine rod 30. On the upper side of the rod, there is a rail 81 for insertion of a threaded plate 83. Depending on the position of the bracket 71, the spring tine 70 can additionally be screwed to the tine rod 30.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

What is claimed is:

1. A reel for a harvester, the reel comprising:
    a reel supporting pipe; and star-shaped supports, each star-shaped support comprising:
  a hub comprising a cylindrical portion having:
    an interior surface forming an opening,
    an exterior surface, and
    a plurality of star arms extending from the exterior surface;
    wherein the opening is co-axially disposed over an end portion of the reel supporting pipe such that the interior surface of the cylindrical portion of the hub extends over an exterior surface of the end portion of the reel supporting pipe;
    wherein each start arm comprises at least two triangular shaped plates, each plate having:
      a shortest side positioned on the exterior surface of the cylindrical portion of the hub and extending along a length of the hub, and
      a side running outwardly in a radial direction from the hub; and
  wherein the star-shaped supports are connected by tine rods that run parallel to the reel supporting pipe.

2. The reel of claim 1 wherein adjacent arms of the plurality of star arms for each star-shaped support are connected to each other by a reinforced plate.

3. The reel of claim 1 wherein at least one of the tine rods is composed of several rod segments.

4. The reel of claim 3 wherein the rod segments are connectable to each other by an interlocking connection.

5. The reel of claim 3 wherein the rod segments are connectable to each other near a tip of an arm for a star-shaped support that is positioned intermediate of the reel supporting pipe.

6. The reel of claim 1 wherein bracings comprising cables are fixed at their ends to the reel supporting pipe and the cables are stretchable in a direction of a longitudinal axis of the supporting pipe.

7. The reel of claim 1 wherein at least one of tine rods is provided with at least one spring tine having a coil that is at least partially embedded in the at least one tine rod.

8. The reel of claim 1 wherein at least one spring tine is fixed to at least one of the tine rods by a bracket.

* * * * *